(12) United States Patent
Critz et al.

(10) Patent No.: US 7,363,518 B2
(45) Date of Patent: Apr. 22, 2008

(54) INFORMATION HANDLING SYSTEM WITH POWER FAULT PROTECTION CIRCUIT

(75) Inventors: Christian L. Critz, Georgetown, TX (US); John J. Breen, Harker Heights, TX (US); Jon Goodfleisch, deceased, late of Austin, TX (US); by Annette M. Kobus, legal representative, Austin, TX (US); Daniel W. Kehoe, Cedar Park, TX (US); Nikolai V. Vyssotski, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 368 days.

(21) Appl. No.: 10/896,685

(22) Filed: Jul. 22, 2004

(65) Prior Publication Data
US 2006/0020833 A1    Jan. 26, 2006

(51) Int. Cl.
*G06F 1/26*    (2006.01)

(52) U.S. Cl. ........... 713/300; 713/323; 713/330; 713/340; 361/6; 361/18; 314/115; 314/135; 714/14; 714/22; 714/36

(58) Field of Classification Search ........... 713/300; 361/6, 18; 314/115, 135
See application file for complete search history.

(56) References Cited

U.S. PATENT DOCUMENTS

| | | | | |
|---|---|---|---|---|
| 4,609,982 A | * | 9/1986 | Gohda | 363/89 |
| 5,187,425 A | * | 2/1993 | Tanikawa | 320/138 |
| 5,717,306 A | * | 2/1998 | Shipp | 307/125 |
| 5,758,171 A | * | 5/1998 | Ramamurthy et al. | 713/300 |
| 6,054,846 A | * | 4/2000 | Castleman | 323/283 |
| 6,058,034 A | * | 5/2000 | Cummings et al. | 363/74 |
| 6,130,813 A | | 10/2000 | Kates et al. | |
| 6,160,386 A | * | 12/2000 | Hemena et al. | 323/272 |
| 6,507,173 B1 | * | 1/2003 | Spiridon et al. | 320/162 |
| 6,516,418 B1 | * | 2/2003 | Lee | 713/320 |
| 6,549,490 B1 | * | 4/2003 | Howarth | 369/30.27 |
| 6,606,227 B2 | * | 8/2003 | Rapsinski et al. | 361/86 |
| 6,885,745 B1 | * | 4/2005 | Handforth et al. | 379/412 |
| 6,901,520 B2 | * | 5/2005 | Odaohhara et al. | 713/300 |
| 6,936,936 B2 | * | 8/2005 | Fischer et al. | 307/151 |
| 6,969,970 B2 | * | 11/2005 | Dias et al. | 320/106 |
| 6,972,542 B2 | * | 12/2005 | Patino et al. | 320/106 |
| 6,987,378 B1 | * | 1/2006 | Steele | 323/222 |
| 6,996,734 B2 | * | 2/2006 | Fiebrich et al. | 713/340 |
| 7,028,202 B2 | * | 4/2006 | Long et al. | 713/340 |
| 2002/0167294 A1 | | 11/2002 | Odaohhara | |
| 2003/0011345 A1 | | 1/2003 | Hanfusa et al. | |
| 2003/0197425 A1 | * | 10/2003 | Montante | 307/26 |

OTHER PUBLICATIONS

"Universal AC Adapter for all type of Laptop", Laptopshop I.T. Limited, 2004.

* cited by examiner

*Primary Examiner*—Nitin C. Patel
(74) *Attorney, Agent, or Firm*—Haynes and Boone, LLP

(57) ABSTRACT

An information handling system (IHS) employs a power fault protection circuit to protect the IHS from overvoltages which may occur on an information line from a power adapter to the IHS. The system includes a processor coupled to the protection circuit. The circuit is operative in a first mode to decouple an information line from the IHS in response to a disable command and operative in a second mode to decouple the information line from the IHS when a voltage in the information line exceeds a predetermined threshold voltage.

21 Claims, 3 Drawing Sheets

INFORMATION HANDLING SYSTEM WITH POWER FAULT PROTECTION CIRCUIT

BACKGROUND

The disclosures herein relate generally to information handling systems (IHS's) and more particularly to protecting information handling systems from being exposed to excessive voltages.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In contemporary portable IHSs it is common for the IHS to be supplied DC power by an AC adapter that converts AC mains voltage to a DC voltage that is usable by the IHS. The power cable running between the AC adapter and the IHS typically includes a number of conductors, for example, power conductors and an information conductor. An example of such an information conductor or information line is a power supply ID (PSID) line. The PSID line provides the IHS with information regarding the attributes of the particular AC adapter coupled to the IHS. For example, the PSID line may provide information such as the name of the manufacturer and the wattage of the particular AC adapter. In some circumstances where the power cable between the AC adapter and the IHS is abused, such as by crushing the power cable, it is possible that the voltage in the power conductors becomes coupled to the PSID line. This can cause damage to circuitry within the IHS that is coupled to an information conductor since information conductors generally are intended to carry data at a low voltage as opposed to the relatively high voltage of the power conductors of the IHS.

What is needed is an IHS which is protected in circumstances where an information conductor experiences higher than normal operating voltages.

SUMMARY

Accordingly, in one embodiment, a method is disclosed for operating an information handling system (IHS) which includes decoupling an information line from the IHS if a voltage on the information line exceeds a predetermined threshold voltage. The method also includes coupling the information line to the IHS if the voltage on the information line does not exceed the predetermined threshold voltage.

In another embodiment, an information handling system (IHS) is disclosed which includes a processor and a protection circuit that is coupled to the processor. The protection circuit is configured to decouple an information line from the IHS when a voltage on the information line exceeds a predetermined threshold voltage.

In another embodiment, an information handling system (IHS) is disclosed which includes a processor and a protection circuit that is coupled to the processor. The protection circuit is operative in a first mode to decouple an information line from the IHS in response to a disable command. The protection circuit is also operative in a second mode to decouple the information line from the IHS when a voltage on the information line exceeds a predetermined threshold voltage.

A principal advantage of one or more of the embodiments disclosed is the protection of the IHS from overvoltages that may occur on an information line to the IHS.

DETAILED DESCRIPTION

Figure 1:
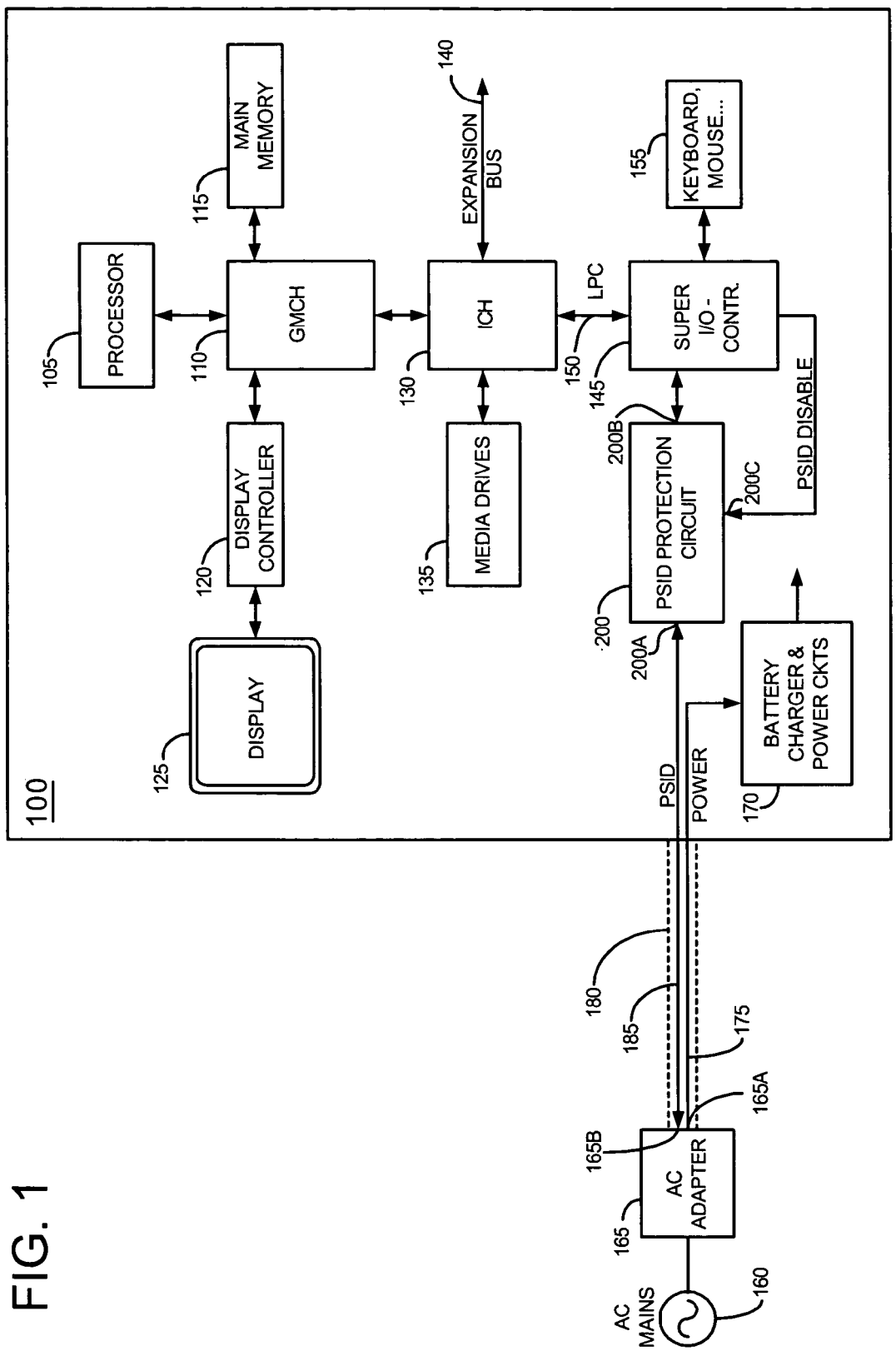
FIG. 1 is a high level block diagram of the disclosed information handling system (IHS).

FIG. 1 is a block diagram of the disclosed information handling system (IHS) 100. For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a video display, a keyboard, a mouse, voice inputs and other human interface devices (HIDs). The information handling system may also include one or more buses operable to transmit communications between the various hardware components.

IHS 100 includes a processor 105 such as an Intel Pentium series processor, an Advanced Micro Devices (AMD) processor or one of many other processors currently available. A graphics/memory controller hub (GMCH) chip 110 is coupled to processor 105 to facilitate memory and display functions. System memory 115 and a display controller 120 are coupled to GMCH 110. A display 125 can be coupled to display controller 120 to provide visual images to the user. An I/O controller hub (ICH) chip 130 is coupled to GMCH chip 110 to facilitate input/output functions for the IHS. Media drives 135 are coupled to ICH chip 130 to provide permanent storage to the IHS. An expansion bus 140 is coupled to ICH chip 130 to provide the IHS with additional plug-in functionality. Expansion bus 140 may be a PCI bus, PCI Express bus, SATA bus, USB or virtually any other expansion bus.

A super I/O controller 145 is coupled to ICH 130 by a low pin count (LPC) bus 150. Super I/O controller 145 integrates several functions together in a common chip, for example, control of serial ports, parallel ports, keyboard, mouse, floppy drive and other I/O functions. A keyboard 155 is shown as being coupled to super I/O controller 145.

In this particular embodiment, IHS 100 is coupled to a source of AC power, namely AC mains 160. An AC adapter 165 is coupled between AC mains 160 and IHS 100 to provide IHS 100 with a source of DC power. The AC adapter 165 converts the AC mains power to DC that is usable by the IHS. In more detail, AC adapter 165 includes a DC output 165A which is coupled to battery charger 170 by DC voltage lines 175. In actual practice, there may be two or more DC voltage lines 175, although in FIG. 1 only one voltage line is illustrated for simplicity. Voltage lines 175 are situated inside an adapter power cable 180 that runs between adapter 165 and IHS 100. Adapter power cable is illustrated in dashed lines in FIG. 1.

Also included in adapter power cable 180 is a power supply identifier line, namely PSID line 185. PSID line 185 is coupled between the PSID output 165B and super I/O controller 145 as shown. The PSID signal on PSID line 185 reports various information descriptive of AC adapter 165 back to super I/O controller 145. For example, the PSID signal can include such attributes of AC adapter 165 as the adapter manufacturer, the wattage/power rating of the adapter and other descriptive information. The voltage on DC voltage lines 175 can be a relatively high voltage, for example 20 volts in one IHS. In contrast, when information handling system 100 is engaged in normal operation, the voltage level on the PSID line 185 is very low which is typical for a data line, for example 3 to 5 volts. However, there are circumstances where through user fault it is possible that the voltage on this line may go so high as to damage super I/O controller 145. For example, if the user were to accidentally or otherwise crush adapter power cable 180, DC voltage lines 175 may come in contact with PSID line 185. The relatively high voltage from the DC voltage lines 175 may then flow over PSID line 185 to super I/O controller 145 thus causing damage to that chip.

Figure 2:
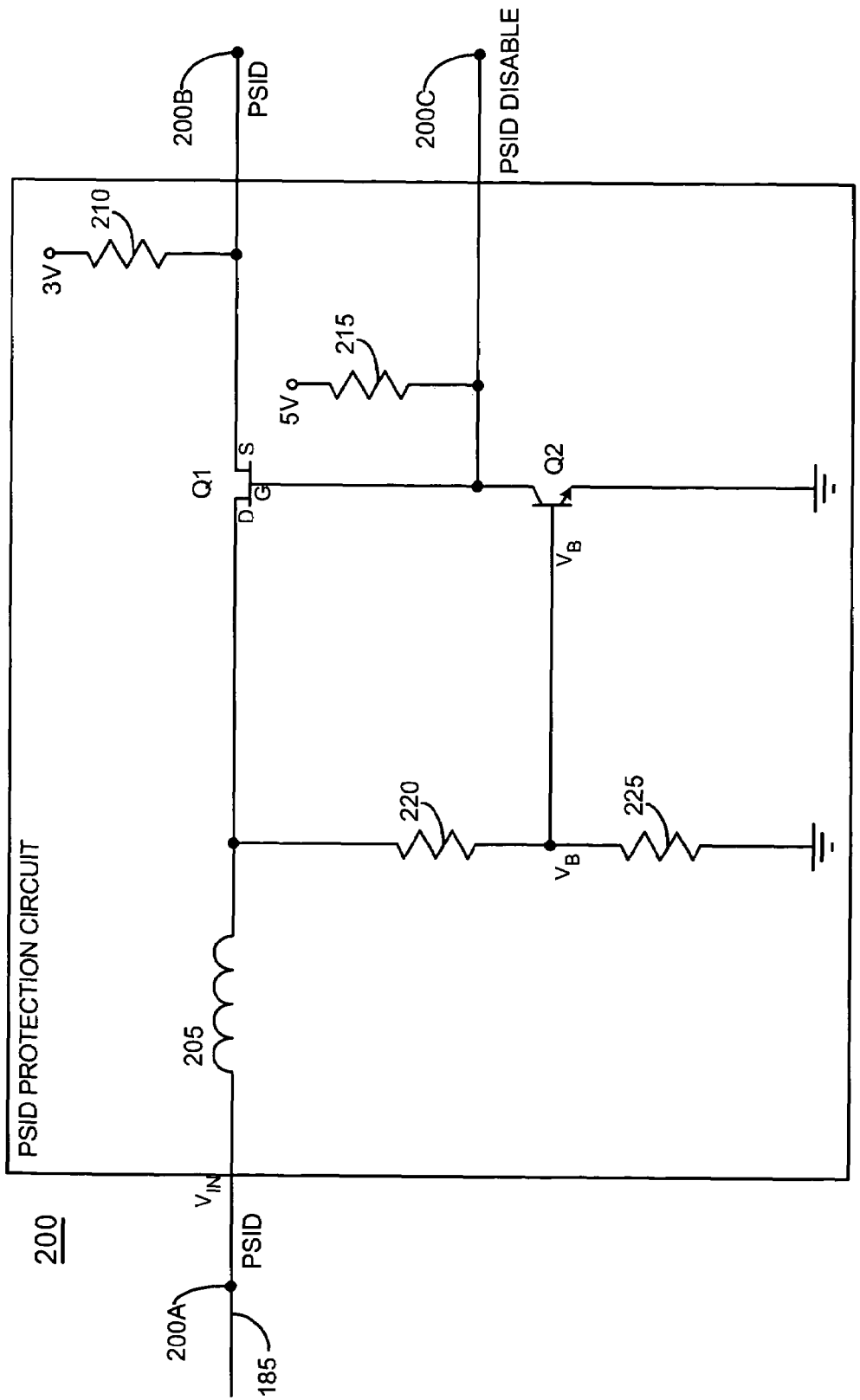
FIG. 2 is a schematic diagram showing one embodiment of an overvoltage protection circuit employed in the disclosed IHS.

FIG. 2 is a schematic diagram of PSID protection circuit 200. PSID protection circuit 200 is situated in PSID line 185 between AC adapter 165 and super I/O controller 145 to prevent the type of damage discussed above. PSID protection circuit 200 includes ports 200A and 200B and an PSID DISABLE input 200C. A switching transistor Q1 is situated in the PSID line 185 between PSID ports 200A and 200B. When switching transistor Q1 is open, the PSID line is open such that IHS 100 is effectively decoupled and protected from potential high voltages on the PSID line.

An inductor 205 is situated in PSID line 185 between ports 200A and the drain of transistor Q1 to provide electromagnetic compatibility (EMC) protection. The source of transistor Q1 is coupled to a 3 volt power supply by resistor 210. A switching transistor Q2 is coupled between the gate of transistor Q1 and ground and shown. The state of transistor Q2 determines whether switching transistor Q1 is on or off. The collector of transistor Q2 is pulled high to five volts by a pull-up resistor 215 which is coupled between the collector and a 5 volt power supply. The collector of transistor Q2 is coupled to PSID DISABLE input 200C. IHS 100 provides a PSID DISABLE signal to PSID DISABLE input 200 C to instruct transistor Q1 of PSID protection circuit whether to open or close. It is desirable to close transistor Q1 so that adapter attributes may be gathered from adapter 165 over PSID line 185 by the IHS. It is also desirable to open transistor Q1 once the attributes are gathered so that the IHS can be protected from any high voltage signals that may appear on the PSID line in future. The PSID DISABLE signal at input 200 C is a logic low true signal. This means that when the PSID DISABLE signal is low, the PSID line 185 is disabled, meaning that transistor Q1 is not conducting and that the PSID line is open, thus protecting the IHS from high voltages on the PSID line. Conversely, when the PSID DISABLE signal is high, the PSID line 185 is enabled or fully connected, meaning that transistor Q1 is conducting and connecting the PSID line 185 to the IHS. In this conducting state or mode, the IHS is able to gather attributes from adapter 165 over the PSID line. As discussed above, PSID protection circuit 200 provides a first mode of protection wherein circuit 200 effectively disconnects the PSID line from the IHS when so he instructed. A second mode of protection will now be discussed wherein PSID protection circuit 200 responds to overvoltages on the PSID line 185 to effectively disconnect the PSID line from the IHS when an overvoltage condition occurs on the PSID line.

$V_{IN}$ is defined as the voltage at the input 200A of PSID protection circuit 200. During normal operation, $V_{IN}$ will be a relatively low value such as is appropriate for data transmission, for example a few volts such as in 3 volt or 5 volt systems. However, if $V_{IN}$ goes above a predetermined threshold voltage, for example six volts, then it is assumed that a fault condition has occurred. This improperly high voltage will be sensed by the resistor 220-resistor 225 voltage divider that provides $V_B$, a divided down version of the $V_{IN}$ signal, to the base of transistor Q2. When $V_B$ thus goes high, transistor Q2 turns on which pulls the PSID disable input 200 C low to turn off transistor Q1. A second mode of protection is thus provided wherein if $V_B$ goes improperly high, switching transistor Q1 turns off to isolate the IHS from the PSID line. Conversely, if $V_{IN}$ exhibits a low voltage less than the predetermined threshold voltage, transistor Q2 will remain off and switching transistor Q1 will be allowed to turn on, provided the PSID DISABLE signal at 200C has been set to high to command PSID protection circuit 200 to connect PSID line 185 to the IHS.

To aid understanding the operation of PSID protection circuit 200, a truth table entitled TABLE 1 is included below showing how the PSID protection circuit responds to input signal conditions (e.g. $V_{IN}$) and commands (e.g. PSID DISABLE).

TABLE 1

| PSID DISABLE SIGNAL (Input 200 C.) | $V_{IN}$ (divided down to $V_B$ at the base of Q2) | Q1 State |
|---|---|---|
| 0 v | $V_{IN} < 6$ v ($V_B < 0.7$ v) | Open (not conducting) |
| 0 v | $V_{IN} > 6$ v ($V_B > 0.7$ v) FAULT | Open (not conducting) |
| 5 v | $V_{IN} < 6$ v ($V_B < 0.7$ v) | Closed (conducting) Normal Operation Read Attributes |
| 5 v | $V_{IN} > 6$ v ($V_B > 0.7$ v) FAULT | Open (not conducting) |

At those times when the PSID DISABLE signal exhibits 0 volts (or logic low) and $V_{IN}$ is less than six volts, then switching transistor Q1 is open, i.e. not conducting. This effectively isolates the IHS from the PSID line. At those times when the PSID DISABLE line still exhibits 0 volts and $V_{IN}$ is greater than six volts, a fault condition exists and switching transistor Q1 is still open thus protecting the IHS from the high voltage fault on the PSID line. However, if the PSID DISABLE signal is changed to exhibit five volts which is equivalent to a logical high in this embodiment, and $V_{IN}$ is less than the six volt threshold, then switching transistor Q1 is closed or in a conducting state. The PSID line from the AC adapter is now coupled to the IHS such that the PSID protection circuit will permit querying of the AC adapter by the IHS for the purpose of collecting AC adapter attributes. This querying and collection of AC adapter attributes is done over the bidirectional PSID line 185 under software control by the IHS. When the IHS initially powers up, it sends a logical high on PSID disable input 200C that in effect commands PSID protection circuit 200 to connect the PSID line of the AC adapter to the IHS. Provided a high voltage fault condition does not exist on PSID line 185, the PSID protection circuit 200 will carry out that command. Finally, in this scenario where a logical high is presented on PSID DISABLE input 200C, should be the $V_{IN}$ voltage exceed the six volt threshold, then a fault condition exists and switching transistor Q1 will be opened to prevent the IHS from connecting to PSID line 185. The IHS is thus protected from undesired high voltages appearing on the PSID line.

It is noted that in the discussion above, the PSID DISABLE command uses low true logic, namely, the PSID line is disabled (or decoupled) when the PSID DISABLE command is asserted as signified by a logical zero or low value for the PSID DISABLE command. When the PSID DISABLE command is de-asserted, the PSID line 185 will become coupled to the IHS provided the voltage on the PSID line 185 does not exceed the predetermined threshold voltage. Those skilled in the art will appreciate that an equivalent protection circuit with inverted logic may be employed wherein the PSID DISABLE command exhibits a logic low to cause the protection circuit to be enabled to couple the PSID line to the IHS and a logic high to cause the protection circuit to de-couple the PSID line from the IHS. It is also possible to use a PSID ENABLE signal which exhibits a logic high to enable the protection circuit to couple the PSID line to the IHS and a logic low to instruct the protection circuit to de-couple the PSID line from the IHS. This logic may also be inverted.

Figure 3:
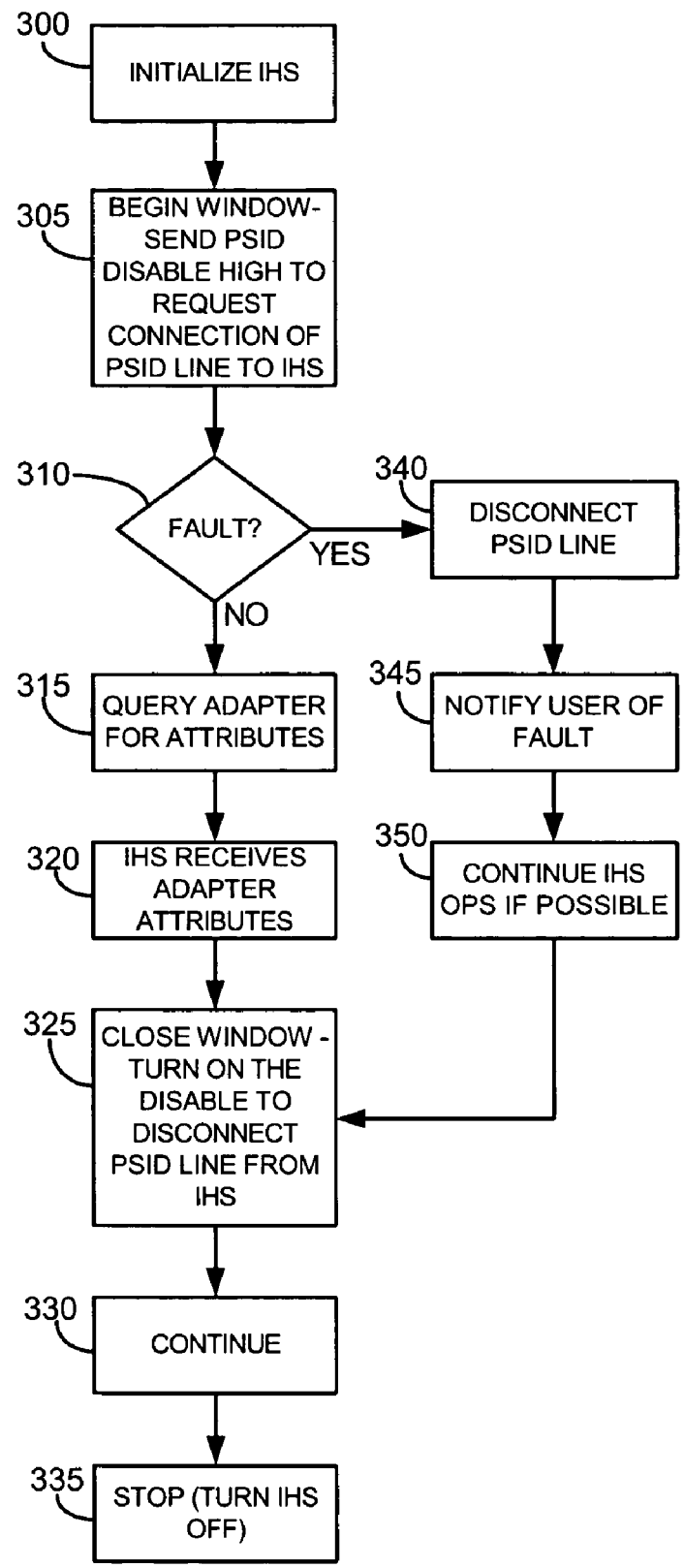
FIG. 3 is a flowchart depicting a method of operating the disclosed IHS.

FIG. 3 is a flowchart showing the operational flow of one embodiment of the disclosed methodology. IHS 100 is initialized as per block 300. A window is then begun at block 305 in which the IHS will attempt to gather adapter attributes from AC adapter 165 over the PSID line. To begin the window, the IHS sends a PSID DISABLE high signal to request connection of the PSID line to the IHS. A test is then conducted at decision block 310 to determine if a fault condition exists on the PSID line 185 from the AC adapter 165. If the voltage on the PSID line does not exceed a predetermined threshold, then a fault condition does not exist. In this event, the IHS continues operation and queries the AC adapter for attributes as per block 315. This query is performed on the PSID line 185 in this embodiment. The AC adapter then sends its adapter attributes to the IHS over the PSID line. The adapter attributes are received by the IHS as per block 320. Once the attributes are received by the IHS, the window closes and the IHS sends a PSID DISABLE low to instruct the PSID circuit to disconnect the IHS from the PSID line as per block 325. IHS operations then continue as per block 330 and when the user desires the IHS is turned off as per block 335. Returning now to decision block 310 where a test was conducted to determine whether a fault condition exists, namely an improper high voltage exists on the PSID line, if such a fault condition is found then the PSID line 185 is disconnected or decoupled from the IHS as per block 340. The user is then notified of this fault by an appropriate image on the IHS display or other indication as per block 345. Operation of the IHS will continue forward as per block 350 if possible, for example if the AC adapter has sufficient wattage to power the IHS. The window is closed at block 325 and IHS operation continues as per block 330. In one embodiment, at block 350, although the IHS may be able to continue operation, it will be unable to read adapter information. In this case, the IHS make take other action, such as operating in a reduced power mode, preventing battery charging, undergoing a controlled shutdown or other desired action.

The disclosed methodology and apparatus protect the information handling system from undesirable fault conditions that may be present on one or more input lines of the system.

It is noted that when one component is coupled to another, it is possible that the coupling may occur through one or more intermediate circuits or devices. Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A method of operating an information handling system (IHS) comprising:
 providing an information line from a power adapter, wherein the information line is distinct from a voltage line from the power adapter;
 decoupling the information line from an IHS if a voltage on the information line exceeds a predetermined threshold voltage;
 coupling the information line to an IHS if the voltage on the information line does not exceed the predetermined threshold voltage; and
 providing an electromagnetic compatibility (EMC) protection device coupled between the power adapter and the IHS.

2. The method of claim 1 including decoupling the information line from the IHS on command from the IHS.

3. The method of claim 1 including coupling the information line to the IHS on command from the IHS.

4. The method of claim 1 including reading attributes from the information line when the information line is coupled to the IHS.

5. The method of claim 4 wherein the attributes are power adapter attributes including at least one of a designation of the power adapter manufacturer and the power rating of the power adapter.

6. A method of operating an information handling system (IHS) comprising:
 asserting a disable command,
 decoupling an information line from an IHS when the disable command is asserted, wherein the asserting the disable command is independent of a condition of the information line and the information line comprises an information line from a power adapter and is distinct from a voltage line from the power adapter; and providing an electromagnetic compatibility (EMC) protection device coupled between the power adapter and the IHS.

7. The method of claim 6 including decoupling the information line from the IHS when a voltage on the information line exceeds a predetermined threshold voltage.

8. The method of claim 6 including de-asserting the disable command to cause the information line to be coupled from the power adapter to the IHS.

9. The method of claim 8 including reading attributes from the power adapter when the disable command is de-asserted.

10. The method of claim 9 wherein the attributes are read over the information line by the IHS.

11. An information handling system (IHS) comprising:
a processor;
a protection circuit, coupled to the processor, configured to decouple an information line from the IHS when a voltage on the information line exceeds a predetermined threshold voltage, wherein the information line comprises an information line from a power adapter and is distinct from a voltage line from the power adapter; and
an electromagnetic compatibility (EMC) protection device coupled between the power adapter and the IHS.

12. The IHS of claim 11 wherein the information line is a power supply ID line.

13. The IHS of claim 11 wherein the protection circuit is further configured to decouple the information line from the IHS upon command, wherein the command is independent of a condition of the information line.

14. The IHS of claim 11, wherein the information line transports power adapter attribute information.

15. The IHS of claim 14 wherein the power adapter attribute information includes the power rating of an AC adapter.

16. An information handling system (IHS) comprising:
a processor;
a protection circuit, coupled to the processor, operative in a first mode to decouple an information line from the IHS in response to a disable command, wherein the disable command is independent of a condition of the information line, and operative in a second mode to decouple the information line from the IHS when a voltage on the information line exceeds a predetermined threshold voltage, wherein the information line comprises an information line from a power adapter and is distinct from a voltage line from the power adapter; and
an electromagnetic compatibility (EMC) protection device coupled between the power adapter and the IHS.

17. The IHS of claim 16 wherein the information line conveys power adapter attribute information from the power adapter.

18. The IHS of claim 17 wherein the attribute information includes the power rating of the power adapter.

19. The IHS of claim 16 wherein the protection circuit is configured to couple the information line to the IHS when the disable command is de-asserted.

20. The IHS of claim 19 wherein the protection circuit is configured to pass attribute information to the IHS when the disable command is de-asserted.

21. An information handling system (IHS) comprising:
a chassis;
a processor mounted in the chassis;
means coupled to the processor, operative in a first mode to decouple an information line from the IHS in response to a disable command, wherein the disable command is independent of a condition of the information line, and operative in a second mode to decouple the information line from the IHS when a voltage on the information line exceeds a predetermined threshold voltage, wherein the information line comprises an information line from a power adapter and is distinct from a voltage line from the power adapter; and
an electromagnetic compatibility (EMC) protection device coupled between the power adapter and the IHS.

* * * * *